United States Patent [19]

Boardman et al.

[11] Patent Number: 5,158,741
[45] Date of Patent: Oct. 27, 1992

[54] PASSIVE COOLING SYSTEM FOR TOP ENTRY LIQUID METAL COOLED NUCLEAR REACTORS

[75] Inventors: Charles E. Boardman, Saratoga; Anstein Hunsbedt, Los Gatos; Marvin M. Hui, Cupertino, all of Calif.

[73] Assignee: General Electric Company, San Jose, Calif.

[21] Appl. No.: 745,785

[22] Filed: Aug. 16, 1991

[51] Int. Cl.$^5$ .............................................. G21C 15/18
[52] U.S. Cl. .................................... 376/299; 375/403
[58] Field of Search ............... 376/171, 174, 179, 273, 376/293, 298, 299, 402–405

[56] References Cited

U.S. PATENT DOCUMENTS

| | | | |
|---|---|---|---|
| 3,793,143 | 2/1974 | Muller | 376/403 |
| 4,508,677 | 4/1985 | Craig et al. | 376/299 |
| 4,678,626 | 7/1987 | Germer | 376/299 |
| 4,959,193 | 9/1990 | Hunsbedt et al. | 376/299 |
| 5,043,135 | 8/1991 | Hunsbedt et al. | 376/299 |
| 5,043,136 | 8/1991 | Hunsbedt et al. | 376/299 |
| 5,049,353 | 9/1991 | Conway et al. | 376/299 |

Primary Examiner—Daniel D. Wasil
Attorney, Agent, or Firm—Robert R. Schroeder

[57] ABSTRACT

A liquid metal cooled nuclear fission reactor plant having a top entry loop joined satellite assembly with a passive auxiliary safety cooling system for removing residual heat resulting from fuel decay during shutdown, or heat produced during a mishap. This satellite type reactor plant is enhanced by a backup or secondary passive safety cooling system which augments the primary passive auxiliary cooling system when in operation, and replaces the primary cooling system when rendered inoperative.

10 Claims, 2 Drawing Sheets

PASSIVE COOLING SYSTEM FOR TOP ENTRY LIQUID METAL COOLED NUCLEAR REACTORS

The Government of the United States has rights in this invention under Contract No. DE-AC03-89SF17445.

FIELD OF THE INVENTION

This invention relates to an improvement in passive cooling systems for a unique type of liquid metal cooled nuclear reactors having the heat producing core of fissionable fuel substantially submerged within a pool of the liquid metal. A typical liquid metal cooled nuclear reactor is disclosed in U.S. Letters Pat. No. 4,508,677, issued Apr. 2, 1985, and a typical passive cooling system for such liquid metal cooled nuclear reactors is disclosed in U.S. Letters Pat. No. 4,678,626, issued Dec. 2, 1985, and No. 4,959,193, issued Sept. 25, 1990.

BACKGROUND OF THE INVENTION

To deal with emergencies or perform maintenance service in the operation of liquid sodium or sodium-potassium metal cooled nuclear reactors for power generation it may be necessary to shut down the fission reaction of the fuel. Normally reactor shut down is achieved by inserting neutron absorbing controls into the core of fissioning fuel material to deprive the fuel material of neutrons needed to perpetuate the fission reaction. However decay of the fuel material in the shut down nuclear reactor continues to produce heat in substantial quantities which must be continuously dissipated from the reactor system.

The heat capacity of the liquid metal coolant and adjacent structural material assist in dissipating the residual heat. Nevertheless, the structural material of the nuclear reactor may not have the capacity of safely withstanding prolonged high temperatures. For example, the concrete of the walls of the typical reactor silo and other structures may splay and crack when subjected to high or prolonged raised temperatures. Accordingly, auxiliary cooling means or systems are commonly utilized to safely remove heat from the nuclear reactor structure during periods of reactor shut down.

Conventional nuclear reactors have employed a variety of complex energy driven cooling measures to dissipate heat from the fuel core and other components of the reactor system. Occasionally when a reactor shut down occurs, the energy source for actuating and/or operating such auxiliary cooling means may fail. For example, pumps and ventilation systems for performing supplementary fuel core cooling may malfunction or lack power. Moreover, when operator personnel intervention is needed, there are potential situations when an operator may not be responsive or be capable of performing the required action.

Liquid metal cooled reactors utilizing sodium or sodium-potassium as the coolant provides numerous advantages. Water cooled reactors operate at or near the boiling point of water. Any significant rise in temperature results in the generation of steam and increased pressure. By contrast, sodium or sodium-potassium has an extremely high boiling point, in the range of 1800 degrees Fahrenheit at one atmosphere pressure. The normal operating temperature of the reactor is in the range of about 900 degrees Fahrenheit. Because of the high boiling point of the liquid metal, the pressure problems associated with water cooled reactors and the steam generated thereby are eliminated. The heat capacity of the liquid metal permits the sodium or sodium-potassium to be heated several hundred degrees Fahrenheit without danger of materials failure in the reactor.

The reactor vessels for pool-type liquid-metal cooled reactors are essentially open top cylindrical tanks without any perforations to interrupt the integrity of the vessel walls. Sealing of side and bottom walls is essential to prevent the leakage of liquid metal from the primary vessel. The vessel outer surfaces must also be accessible for the rigorous inspections required by safety considerations.

Upon shutdown of the reactor by fully inserting the control rods, residual heat continues to be produced and dissipated according to the heat capacity of the plant. Assuming that the reactor has been at full power for a long period of time, during the first hour following shutdown, an average of about 2% of full power continues to be generated. The residual heat produced continues to decay with time.

To maximize the power capacity in liquid metal cooled, pool type nuclear fission reactor plants, such as noted above and disclosed in the cited patents, it has been proposed to locate the reactor coolant circulating pump and primary heat exchanging units outside of the reactor vessel pool. This system enables the utilization of a larger heat producing fuel core within the reactor vessel, or a reduction in the size of the reactor vessel, which returns certain benefits. Liquid metal cooled pool nuclear reactors of this type comprise multiple component vessels, including the fuel containing reactor primary vessel, assembled with external satellites of one or more circulating pump units and heat exchanger units, operatively connected by top entry loops or conduits for coolant circulation in series between each separate component vessel.

This top entry loop joined, "satellite" assembly reactor system comprises a reactor primary vessel containing a core of fissionable fuel submerged in liquid metal coolant and at least one primary heat transferring liquid metal coolant circuit or loop including a coolant circulating pump component housed within a separate vessel and a heat exchanger component housed within another separate vessel. Top entry loop conduits connect each component vessel in series to provide for liquid metal coolant circulation from the fuel core containing reactor vessel to the pump vessel, then to the heat exchanger vessel and finally back into the reactor vessel to repeat the cycle continuously during operation for transferring fuel core produced heat to the heat exchanges.

This type of top entry loop, multiple component and vessel, satellite reactor system is illustrated in an article entitled "Cost Reduction Study Of A 1000MWe Loop-Type Demonstration Fast Breeder Reactor" by H. Nakagawa et al, published in the *Proceedings of the International Conference On Fast Breeder Systems: Experience Gained and Path to Economic Power Generation.* Sept. 13-17, 1987, pages 4.10-1 to 4.10-11.

Liquid metal cooled pool reactors of such a satellite arrangement comprise open top unit vessels which are closed and protected by means of a shield deck which extends across the open upper end of the reactor vessel and any associated units contained in vessels. Commonly a single shield deck structure bridges the entire expanse of the upper end of the complete assembly of vessels of the satellite system, and may include extending over the open top of the concrete silo.

The invention comprises an improvement in a passive cooling means for removing shutdown decay heat from top entry loop liquid metal coolant, pool nuclear reactor plants.

The disclosed contents of the above noted U.S. Pat. Nos. 4,508,677, 4,678,626, and 4,959,193, and the cited article, all comprising background art, are incorporated herein by reference.

SUMMARY OF THE INVENTION

This invention comprises an improved shutdown, passive heat removal system for top entry loop, liquid metal cooled, pool nuclear reactors which transfers reactor fuel core decay and sensible heat from the reactor fuel core and liquid metal coolant by means of the inherent thermal energy transfer mechanisms of conduction, radiation, convection and material convection of fluids out to the ambient atmosphere. The improved system of the invention is entirely passive and operates continuously through the inherent phenomenon of natural convection in fluids, conduction, convection and thermal radiation.

In the event of a reactor shutdown, after the control rods are fully inserted into the fuel core, the heat produced by the fuel core is transferred by the coolant to the primary reactor and adjoining satellite vessel walls and across the gas filled space between the reactor and containment vessels of each satellite component primarily by thermal radiation, with a small fraction of heat transferred by conduction and convection of the enclosed gas. Surfaces of high thermal emissivity provided on the outside of the reactor and satellite vessels and the interior of the containment vessels increased the efficiency of heat transfer.

Heat is then removed from the outside surface of the containment vessels partly by thermal radiation and partly by direct convection to a flowing air passing over the containment vessel surface. The heat energy is then carried to the outside atmosphere by means of natural convection flow of the heated air.

OBJECTS OF THE INVENTION

It is a primary object of this invention to provide a passive cooling system for top entry loop, liquid metal cooled pool nuclear reactors for removal of decay and sensible heat.

It is another object of this invention to provide a heat removing system for top entry loop, liquid metal cooled pool nuclear reactors which is entirely passive and operates continuously by the inherent phenomenon of natural convection is fluids, conduction, convection, and thermal radiation.

It is a further object of this invention to provide an improved passive cooling system and structural means to operate the same for top entry loop, liquid metal cooled pool nuclear reactors having a covering deck for removing decay and sensible heat from the reactor core and providing support and reinforcement for the covering deck.

It is also an object of this invention to provide a liquid metal cooled pool type nuclear fission reactor having a satellite assembly of component vessels connected in series with top entry loops with an inherently passive cooling system for removing decay produced heat from the fuel core of the reactor and related components.

It is a still further object of this invention to provide a passive shutdown heat removal system comprising natural circulation of cooling air past and about the several separate component vessels of a satellite assembly liquid metal coolant loop type nuclear reactor having top entry loop connecting the component vessels.

DETAILED DESCRIPTION OF THE INVENTION

Figure 1:
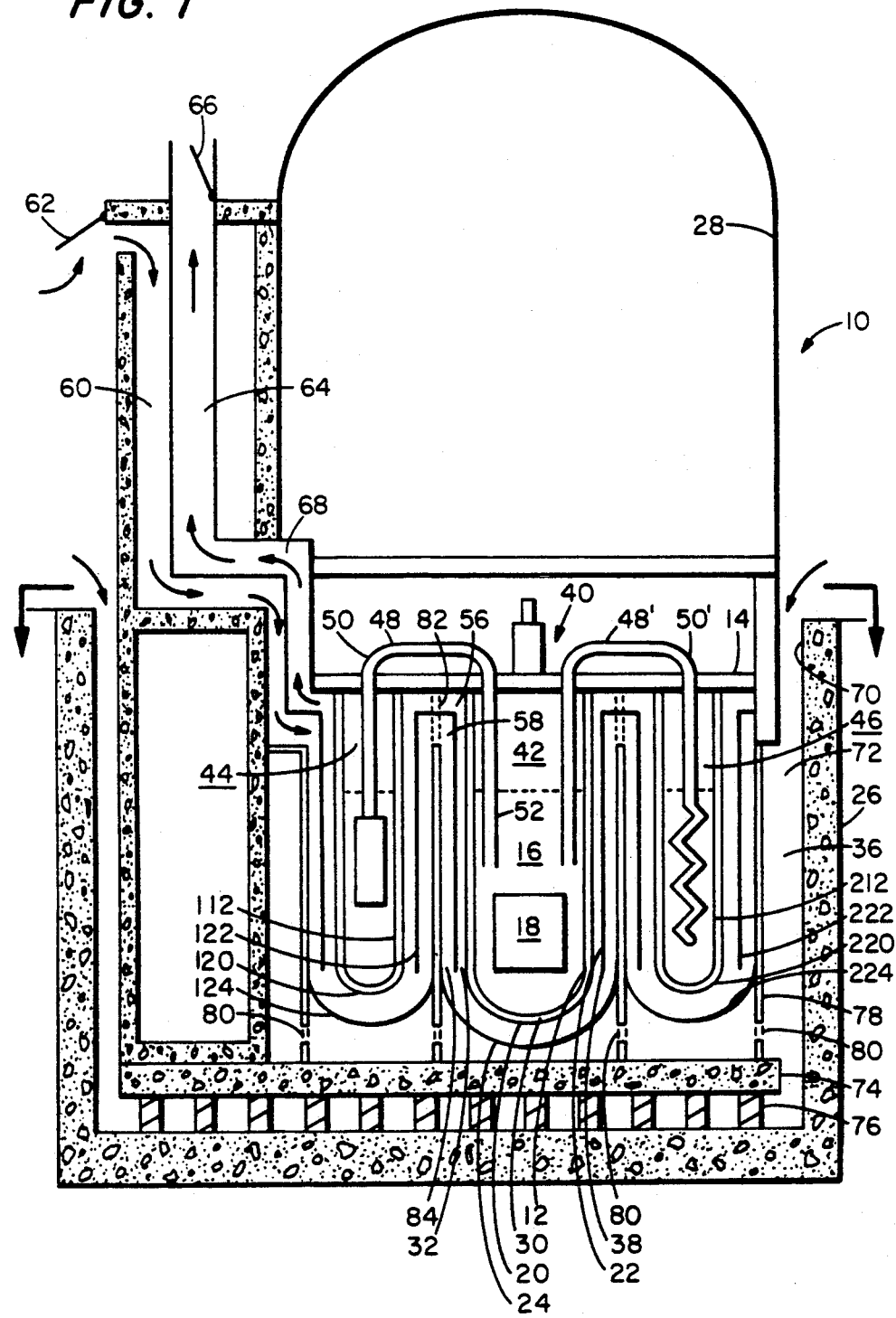
FIG. 1 is a schematic illustration of a top entry loop, satellite assembly liquid metal cooled nuclear reactor plant.
Figure 2:
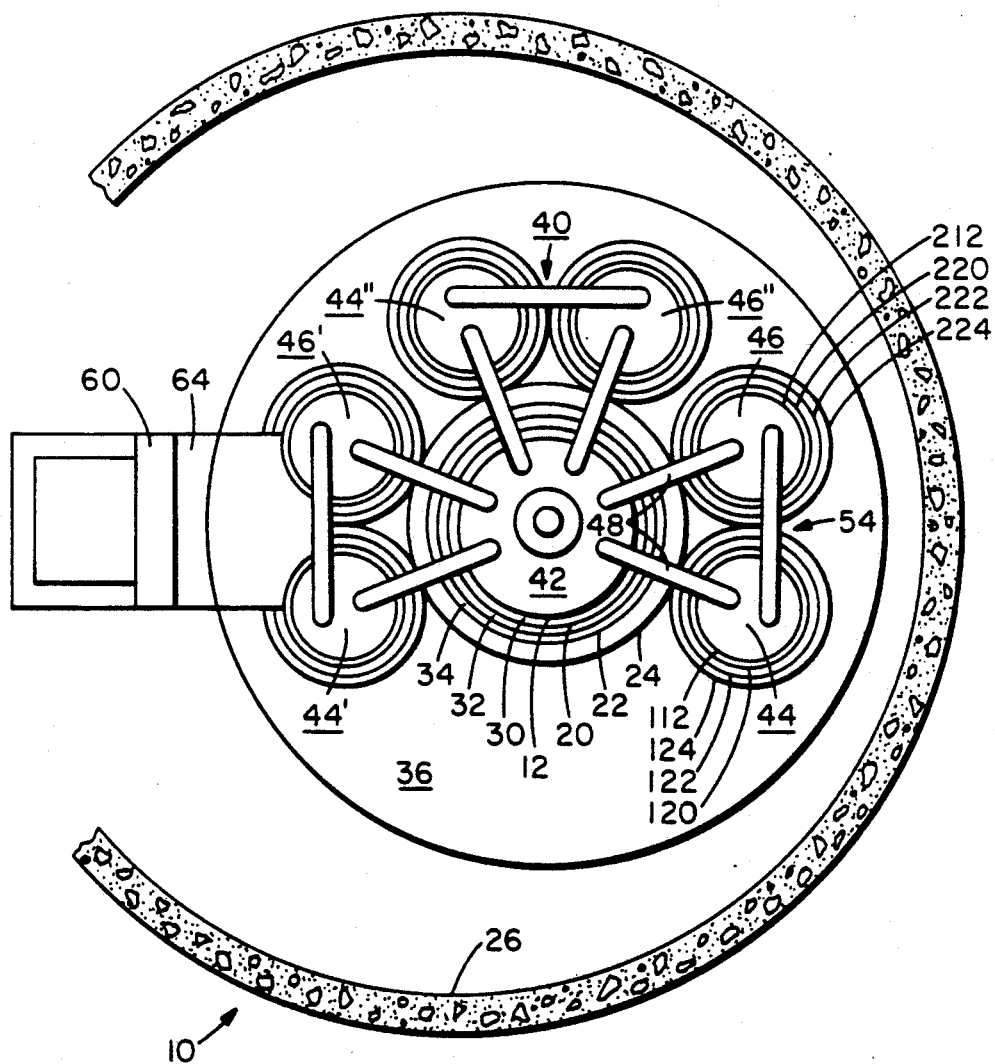
FIG. 2 is a plan view of a top entry loop, satellite assembly liquid metal cooled nuclear reactor plant showing the assembly of individual units and their interconnection.

Modular pool-type liquid metal cooled nuclear reactors with relatively small pool capacity typically have sufficient surface area to accommodate dissipation of residual heat during periods of shutdown. However, such reactors have an overall relatively small power capacity. The problem remaining is to dissipate the residual heat without significantly damaging the containment housing structures. A completely passive cooling system eliminates reliance on energy driven pumps and fans and/or the need for intervention by operating personnel. Moreover, the containment vessel(s) itself must not be structurally modified due to size constraints on modular reactors, and the necessity of a smooth, unperforated tank structure to prevent any areas where stress might accumulate. Strict inspection requirements also require that the containment vessel be simple to inspect both during manufacture and erection of the structures.

Referring to the drawings, a satellite embodiment of a pool-type liquid metal cooled nuclear fission reactor plant 10, with a power producing capability in the 1000 MWG range comprises a reactor primary vessel 12, typically consisting of a cylindrical tank positioned with its longitudinal axis extending vertically upward, and having an open upper end which is attached, covered and closed off by a deck 14. Reactor primary vessel 12 contains a pool of liquid metal coolant 16, such as sodium metal, with a heat producing core of fissionable fuel material 18 substantially submerged within the liquid metal pool 16 for transferring heat away from the fuel core 18. Fission action of the fuel material and the rate thereof is governed by neutron absorbing control rods (not shown) moving out from and into the fuel core 18.

The reactor primary vessel 12 is enclosed within a concentrically surrounding containment vessel 20 in spaced apart relation. The space between the reactor primary vessel 12 and the containment vessel 20 is sealed and filled with a relatively inert gas such as nitrogen or argon. A baffle cylinder 22 concentrically encircles substantially the length of the concentrically superimposed containment and reactor vessels 20 and 12 in spaced apart relation to the outer containment vessel 20. A guard vessel 24 concentrically surrounds the baffle cylinder 22 with the superimposed containment and reactor vessel 20 and 12, in spaced apart relation to the outer baffle cylinder 22. A concrete silo 26 houses this composite of reactor components comprising the concentrically combined and spaced apart arrangement of a bottom supported guard vessel 24, baffle cylinder 22, containment vessel 20 and reactor primary vessel 12. The concrete silo 26 can be arranged concentrically with the assembly of vessels comprising the reactor vessel 12, or positioned off center thereto as shown in the drawings.

Preferably the concrete silo 26 is substantially buried into the ground to the extent that its contained reactor vessel 12 and adjoining vessels are located at least below the ground surface. Placing the liquid metal containing reactor vessel 12 below ground surface precludes the possible escape of any leaking coolant liquid regardless of a loss of structural integrity of the plant. A containment dome 28 covers and encloses the upper portion of the concrete silo 26 and/or reactor plant components to preclude escape of radioactive material into the atmosphere.

This arrangement of these combined enclosing vessel components in surrounding or encircling and spaced apart position, provides for their respective cylindrical side walls forming a series of partitions with intermediate spaces. Specifically, a space 30 between the partitions comprising the side walls of the reactor primary vessel, 12 and the containment vessel 20; a space 32 between the partitions comprising the side walls of the containment vessel 20 and baffle cylinder 22; a space 34 between the baffle cylinder 22 and the guard vessel 24; and a space 36 between the guard vessel 24 and the concrete silo 26. Such intermediate spaces provide for both retaining any coolant leakage and/or in channeling or directing cooling gases such as air.

In a preferred embodiment of the invention wherein the above combined components are generally circular in cross-section and concentrically surround or encircle one another, the intermediate spaces 30, 32, and 34 are each substantially annular in cross-section.

As noted above, the space 30 between the primary reactor and containment vessels 12 and 20, is sealed and contains an inert gas.

The baffle cylinder 22 extends downward between the containment vessel 20 wall and the guard vessel 24 wall substantially to the bottom portion of the reactor primary vessel 12, and with the lower most end of the cylinder terminating a short distance above the bottom of the surrounding guard vessel. Thus, the baffle cylinder 22 provides for fluid communication below its lower end 38 between the space 34 intermediate the guard vessel 34 baffle cylinder 22 and the space 32 intermediate the baffle cylinder 22 and the containment vessel 20.

The top entry loop joined, "satellite" assembly 40 of the nuclear reactor of this invention comprises a group of separated reactor units with each performing a specific role or function such as a unit 42 containing the fuel core 18 for producing heat energy, a unit(s) 44 containing a pump for inducing circulation of the heat transporting liquid metal coolant and a unit(s) 46 containing a heat exchanger for transferring the produced and transported heat from the circulating coolant to another medium for performing work. Thus, a typical top entry loop joined, satellite arranged reactor plant comprises a core of heat producing fissionable fuel 18 submerged in liquid metal coolant 16 as a distinct unit 42 which is housed and contained separately within a composite enclosure including the primary reactor and containment vessels 12 and 20 along with any other designed components such as a cylindrical baffle 22 and guard vessel 24 positioned and arranged as described hereinbefore. Additionally, this type of reactor plant includes one or more separate pump units 44 and/or heat exchanger units 46 each housed and contained separately within its respective composite enclosures corresponding generally with the main heat producing unit 42, namely a primary vessel 112, 212 and containment vessel 120, 220 along with any other designated components such as a baffle cylinder 122, 222 and guard vessel 124, 224. For example, each reactor unit 42 containing a heat producing fuel core 18 can be joined with one or more separate pump units 44 for circulating the heat carrying liquid metal coolant through the series of each separate unit of the satellite reactor assembly 40, and additionally with one or more separate heat exchanger units 46 for transferring the fuel core produced heat carried by the coolant to another medium or system for applying the heat energy to perform work, such as forming steam for generating electrically with a steam turbine driven generator.

The several separate units of the plant satellite assembly 40, comprising the reactor fuel core unit 18, the coolant circulating pump unit(s) 44, and the heat exchanger unit(s) 46, are functionally connected for circulation of the heat transferring liquid metal coolant 16 through each unit in series by means of connecting conduits 48 which enter all unit by passing down through the top of each of the primary vessels. This measure preserves the integrity of the side walls and/or bottom of the primary or inner most vessels retaining the liquid metal coolant 16 and provides greater plant compactness. As such each conduit 48 connection between two separate units comprises a generally inverted U shaped pipe 50 with each downward extending leg 52 portion of the inverted U projecting down into an adjacent separate vessels through their top. This connection of a series comprising a fuel core unit 42 with a pump unit 44 and heat exchanger unit 46 and then back to the fuel core unit 42 with top entry conduits 48, provides a liquid metal coolant circuit or loop 54. The satellite arrangement for a liquid metal pool type reactor system can comprise several coolant circuits or loops 54. The downward extending legs 52 of each connecting conduit 48 preferably project a considerable distance down into each primary vessel whereby the circulating coolant circuit will not be likely to be interrupted by a low coolant level resulting from leakage.

Typically the satellite system comprises a fuel containing reactor unit 18 combined with one or more pairs of circulating pump units 44 with heat exchanger units 46 in series, as illustrated.

The several separate units of a liquid metal cooled, top entry loop, satellite type nuclear reactor plant 10 each carry the radioactive contaminated liquid metal coolant circulating therebetween. Each unit of the assembly is subject to the same potential for mishaps or failures as can occur in the single composite unit of an integrated reactor plant, including leakage and loss of coolant or damage due to breach of vessels or overheating, and the same hazards of leakage and exposure to the atmosphere of a liquid metal coolant such as sodium. Thus, each of the separate units, including specifically the fuel core, pump(s) and heat exchanger(s), of a satellite nuclear reactor plant is provided with the same protective structural measures and function, including, as shown in the drawing, a primary housing vessel, such as 12, 112 and 212, a containment vessel, such as 20, 120 and 220, a cylindrical baffle, such as 22, 122, and 222, and a guard vessel, such as 24, 124 and 224, as is employed for enhanced passive cooling and safety means in a single integrated reactor plant 10.

Accordingly, as shown in the drawing, in keeping with this invention, each separate pump units(s) 44 heat exchanger unit(s) 46 is provided with a primary vessel 112 and 212, a containment vessel 120 and 220, a baffle cylinder 122 and 222, and a guard vessel 124 and 224, essentially like the composite arrangement provided for the fuel core unit 42.

Further in accordance with this invention, the corresponding composite of enclosing components of each unit of the satellite assembly, comprising the fuel core, pump and heat exchanger primary vessels, containment vessels, baffle cylinder and guard vessels, are each spaced apart from their adjacent component thus providing spaces between each component comparable to the spaces 30, 32, and 34 between each of the composite of several components enclosing the fuel core. Additionally, the corresponding spaces between each of the composite components for all units consisting of the fuel core unit 42, pump unit(s) 44 and heat exchanger unit(s) 46, except for the space 30 between the primary vessels and their respective surrounding containment vessel which are sealed with an inert gas content, are interconnected for fluid communication therebetween. Thus the space 32 between the containment vessel 20 and baffle cylinder 22 of the fuel core unit 42 and each pump and heat exchanger units 44 and 46 is connected, and the space 34 between the baffle cylinder 22 and guard vessel 24 of each fuel core, pump and heat exchanger units 42, 44 and 46 is connected. Typically the space 30 between each of the units primary vessels and their respective surrounding containment vessel 20 are sealed off and filled with a suitable inert gas to isolate any leaking liquid metal coolant from contact with atmospheric air. This double vessel arrangement of the primary and containment vessels significantly reduces the possibility of a significant loss of liquid metal coolant resulting in an uncovering of the fuel core or disruption of the coolant circulation flowing through the loop circuit 54 and in turn its heat dissipating function.

Preferably, the corresponding spaces for each unit of the satellite assembly 40 reactor plant, namely, the fuel core 42, pump 44 and heat exchanger 46 units, are each respectively interconnected through a manifold distributor duct or a duct system connecting each of the corresponding spaces of all units. For instance all spaces between the containment vessels 20, 120 and 220 and baffle cylinders 22, 122 and 222, such as space 32, are interconnected in fluid communication through one or more ducts 56 adjacent the upper end of said vessels and cylinders, and all spaces between the baffle cylinders 22, 122 and 222 and the guard vessels 24, 124 and 224, such as space 34, are interconnected in fluid communication through one or more ducts 58 adjacent to the upper end of said cylinders and vessels.

The reactor plant 10 is provided with at least one, and preferably several, downcomer ducts 60 which projects substantially up above the ground level and is in fluid communication with spaces 34 between the baffle cylinders 22, 122 and 222 and the guard vessels 24, 124 and 224 of each unit 42, 44 and 46. A valve(s) 62 is provided to close off duct(s) 60 from opening to the ambient atmosphere. At least one, and preferably several, riser ducts 64 which also projects substantially up above the ground level and is in fluid communication with spaces 32 between the baffle cylinders 22, 122 and 222 and the containment vessels 20, 120 and 220 of each unit 42, 44 and 46. A valve(s) 66 is provided to close off duct(s) 64. As noted above, the spaces 34 and 32 of each unit are connected at their lower area below the bottom end 38 of the common partition or intermediate baffle cylinder 22, 122 and 222; whereby the spaces 34 and 32 are in fluid communication beneath the lower end 38 of the baffle cylinders.

This arrangement of interconnecting the intermediate spaces 34 and 32 forms a circulating of heat carrying or transporting air coolant from the ambient atmosphere down duct 60, through spaces 34 and 32 and up duct 64 back out into the atmosphere.

In operation, heat produced by the fuel is conveyed outward to the reactor primary vessel 12 by the natural convection of the liquid metal coolant 16, then transferred mainly by thermal radiation across the inert gas containing space 30 to the containment vessel 20. The heat is absorbed by air contained in the space 32 which is in contact with the outer surface of the containment vessel 20, and is carried along in the upward air flow resulting from the added heat inducing a natural draft within the space 32 and riser duct 64. The induced natural draft due to added heat circulates air through the fluid flow course 68 including drawing atmospheric air down in duct 60, through spaces 34 and 32 and up in duct 64 back out into the atmosphere. Heat is also transported and distributed by natural convection of primary sodium from unit 42 to units 44 and 46 via the U-tubes 48. Heat is removed by circulating air in a similar manner from these units as well. Collectively, heat transfer from all vessel units is sufficient to maintain safe structural temperatures during a mishap.

However, in the unlikely event of a rupture of both of any one of the liquid metal coolant 16 containing primary vessels 12, 112 or 212, and any one of containment vessels 20, 120 or 220, the liquid metal could leak out into spaces 32 and/or 34. As such the hot liquid metal, typically comprising sodium, would be exposed to the circulating air coolant whereby a chemical fire is likely along with the potential for carrying hazardous radioactive material, sodium vapor and/or combustion products out into the atmosphere through the cooling fluid flow course 68. To cope with this postulated event, the valves 62 and 66 in downcomer ducts 60 and riser ducts 64, respectively, are closed which terminates circulation of cooling air through the fluid flow course 68.

Further in accordance with this invention one or more openings 70 to the atmosphere are provided between the concrete silo 26 and the structural components comprising the units of the reactor satellite assembly 40. Openings 70 can be formed by an open perimeter area between the structural components of the reactor satellite assembly 40 and the concrete silo 26, such as the seismic gap 72 provided when the reactor assembly 40 rests on a reactor base 74 which is mounted on seismic isolating shock absorbers 76, as illustrated in the drawings.

Opening(s) 70 provides for a backup or secondary passive heat removal system for top entry loop connected, satellite assembly liquid metal pool reactor 40 upon the closing of valves 62 and 66 and shutdown of the primary passive cooling system of fluid flow course 68, such as may be required by a vessel breach resulting in leakage of liquid metal coolant into space 32 and/or 34 or into spaces 122 and/or 124 and 222 and/or 224 of the satellite units 44 and 46. The added heat of the leaking hot liquid metal from the reactor fuel core 18 and vessel 12 induces a natural draft of air contacting the increased heat of structural components of the satellite assembly units such as results from air passing over the exterior of the guard vessels 24, 124 and 224. The heated air flows upward and out through opening 70 out into the atmosphere while cooler air from the ambient atmosphere is drawn down in through the opening 70 to replace the venting hot air. Thus, upon the occurrence of increased temperatures occurring on the surface of any one of the guard vessels 24, 124 and/or 224, due to liquid metal leakage and/or closure of valves 62 and 66, a passive natural circulation of atmospheric air in a secondary fluid flow course 72, through the seismic gap, removes heat from about the reactor components, providing an additional safety feature. This passive cooling due to natural circulation of air maintains a cooling effect over the overall outer surface of the guard vessels 24, 124 and 224 regardless of personnel action, automated means or availability of electrical or other sources of power.

A significant aspect of this invention in that a support means 78 is provided for the cover deck 14 by the guard vessels 24, 124 and 224 resting on the reactor base 74. A preferred guard vessel support means 78 comprises a structural cylinder as illustrated which extends the cylindrical side wall of the guard vessels down therefrom to the reactor base 74 resting on seismic shock absorbers 76. Such a support means 78 can be formed by adding a cylindrical section extending down from the cylindrical guard vessels 24, 124 and 224, or by inserting and affixing a concave vessel bottom within a cylinder forming both the guard vessel side wall and support means 78. In any case, a cylindrical support means 78, or any other closed underlying support for the guard vessels should be provided with several openings such as orifices 80 to enable an ample flow of coolant air over the outer surface of the bottom of the guard vessels as well as over the side walls thereof through the phenomenon of passive natural circulation.

The guard vessel support means 78, additionally includes upward projecting portions of the cylindrical side wall or columns or structural struts 82 extending up from the guard vessel top edges, continuing upward to the deck 14 bridging across the top of the reactor satellite units. These struts carry the loads on the deck via the guard vessels directly to the reactor base 74 support or reinforcement for the reactor deck 14, and the support means 78 are constructed so that vertical loads are transmitted between the support cylinders and the deck 14 by means such as columns or struts 80 so as not to impede the flow of cooling air circulating within the spaces 34 and 32 of each unit comprising the reactor fuel core unit 42, the pump unit(s) 44 and the heat exchanger unit(s) 46. The cylindrical support means 78 provide several significant functions. They transmit the weight carried by the reactor deck 14 to the reactor base 74, provide an outer flow annulus for the passive natural circulation of cooling air, and provide an extra vessel enclosure for retaining any leaking liquid metal coolant whereby a second or outer cooling air circuit can flow through the backup fluid flow course 72 separated from leaking metal coolant for cooling the system.

The passive cooling due to natural circulation throughout the structural members of the top entry loop, satellite reactor assembly operates continuously due to generated or residual heat, and maintains the support cylinders 78 and related components including columns or struts 82 at near ambient temperatures. This eliminates or reduces any possibility for differential thermal expansion between the steel and concrete portions of the reactor plant under normal or faulted conditions. Thus a common problem associated with bottom supported vessels which must interface with the reactor deck is eliminated.

What is claimed is:

1. A passive cooling system for liquid metal cooled nuclear fission reactors comprising the combination of:
a liquid metal cooled nuclear reactor plant comprising a satellite assembly with a reactor vessel component containing a heat producing core of fissionable fuel submerged in a pool of liquid metal coolant and having at least one primary heat transferring liquid metal coolant loop circuit including a pump component housed in a vessel paired with a heat exchanger component housed in a vessel, said components being connected in series by means of top entry loop conduits extending down into the component Vessels to provide for circulating liquid metal coolant in series from the reactor component vessel through the pump component vessel and the heat exchanger component vessel then back to the actor component vessel; and
a passive cooling system including a series of spaced apart side-by-side partitions in generally concentric arrangement surrounding each component of the reactor satellite assembly forming a sequence of adjoining fluid flow space enclosures for the circulation of cooling fluid intermediate the partitions and heat transfer cooling through said space enclosures, the respective space enclosures around each assembly component being connected in fluid communication with the corresponding space enclosures of the other assembly components, said passive cooling system including a containment vessel substantially surrounding each of the vessels housing an assembly component in spaced apart relation, a cylindrical baffle wall substantially encircling each containment vessel of the assembly in spaced apart relation, a guard vessel substantially surrounding each containment vessel and cylindrical baffle wall of the assembly in spaced apart relation, a concrete silo substantially surrounding the guard vessels of the assembly in spaced apart relation, a fluid flow heat transferring circuit for the passage of air coolant extending downward from the ambient atmosphere above the reactor vessel and concrete silo into the space intermediate the guard vessel and cylindrical baffle wall of each assembly component and around the bottom edge of the cylindrical baffle wall and upward through the space intermediate the cylindrical baffle wall and the containment vessel of each assembly component and returning back out into the ambient atmosphere above the reactor vessel and concrete silo.

2. The passive cooling system for liquid metal cooled nuclear fission reactors of claim 1, wherein the satellite assembly comprising the reactor vessel component and the primary heat transferring liquid metal coolant loop pump and heat exchanger components are located substantially buried below ground level.

3. The passive cooling system for liquid metal cooled nuclear fission reactors of claim 1, wherein the liquid metal cooled nuclear reactor plant comprising a satellite assembly including a reactor component connected in fluid communication by means of top entry conduits in multiple primary heat transferring liquid metal coolant loop circuits each having a paired pump component housed in a vessel and heat exchanger component housed in a vessel.

4. The passive cooling system for liquid metal cooled nuclear fission reactors of claim 1, wherein the reactor vessel, containment vessel, cylindrical baffle and guard vessel are each circular in cross-section of respectively increasing diameter and concentrically arranged with their side walls providing spaced apart portions forming annular intermediate areas therebetween.

5. A passive cooling system for liquid metal cooled, top entry loop nuclear fission reactors comprising the combination of:

a liquid metal cooled nuclear reactor plant including a satellite assembly with a reactor component comprising a primary vessel containing a heat producing core of fissionable fuel submerged in a pool of liquid metal coolant and having at least one primary heat transferring liquid metal coolant top entry loop circuit including a pump component housed in a primary vessel paired with a heat exchanger component housed in a primary vessel, said components being connected in series with top entry loop conduits providing for circulating liquid metal coolant in series from the primary vessel of the reactor component through the primary vessel of the pump component and the primary vessel of the heat exchanger component then back to the vessel of the reactor component: and a passive cooling system including a series of spaced apart side-by-side partitions in generally concentric arrangement surrounding each component of the reactor satellite assembly forming a sequence of adjoining fluid flow space enclosures for the circulation of fluid intermediate the partitions and heat transfer cooling through said space enclosures, the respective space enclosures around each satellite assembly component being connected in series fluid communication with the corresponding space enclosures of the other assembly paired component vessels, said passive cooling system including a containment vessel substantially surrounding each of the primary vessels housing an assembly component in spaced apart arrangement, a cylindrical baffle wall substantially encircling each containment vessel of the satellite assembly in spaced apart relation, a guard vessel having a cylindrical support substantially surrounding each containment vessel and cylindrical baffle wall of the reactor satellite assembly in spaced apart relation said guard vessel supports resting on a reactor base, a concrete silo substantially surrounding the satellite assembly of reactor components, and a reactor shield deck bridging overhead substantially across the concrete silo and each primary vessel and its surrounding containment vessel closing off the upper ends of each of said primary and containment vessels, the cylindrical supports of the guard vessels providing support and reinforcement to the overhead reactor shield deck, a fluid flow heat transferring circuit for the passage of air coolant through a duct extending downward from the ambient atmosphere above the reactor primary vessel and surrounding concrete silo into the space intermediate the guard vessel and cylindrical baffle wall of each assembly component and around a bottom edge of the cylindrical baffle wall and upward through the space intermediate the cylindrical baffle wall and the containment vessel of each assembly component for cooling the surface of the containment vessels by absorbing heat and returning air upward through a duct and out into the ambient atmosphere above the reactor vessel and concrete silo carrying the absorbed heat from reactor components.

6. The passive cooling system for liquid metal cooled nuclear fission reactors of claim 5, wherein the satellite assembly comprising the reactor vessel component, and the primary heat transferring liquid metal coolant loop pump and heat exchanger components and housing vessels therefor are located substantially buried below ground level.

7. The passive cooling system for liquid metal cooled nuclear fission reactors of claim 5, wherein the primary vessel, the containment vessel, the cylindrical baffle and the guard vessel of each component of the satellite assembly ar circular in cross-section, sequentially of respectively increasing diameter and concentrically arranged with their side walls providing spaced apart partitions forming a series of annular intermediate areas therebetween.

8. The passive cooling system for liquid metal cooled nuclear fission reactors of claim 5, wherein the cylindrical supports of the guard vessels are resting upon a floor comprising the base for the reactor plant satellite assembly.

9. The passive cooling system for liquid metal cooled nuclear fission reactors of claim 5, wherein the cylindrical supports of the guard vessels are provided with openings in each cylinder below the bottom of the guard vessels to enable cooling fluid to flow through the cylinder supports across the bottom of the guard vessel.

10. A passive cooling system for liquid metal cooled, top entry loop nuclear fission reactors comprising the combination of:

a liquid metal cooled nuclear reactor plant including a satellite assembly with a reactor component comprising a primary vessel containing a heat producing core of fissionable fuel submerged in a pool of liquid metal coolant and having at least one primary heat transferring liquid metal coolant top entry loop circuit including a pump component housed within a primary vessel paired with a heat exchanger component housed within a primary vessel, said components being connected in series with top entry loop conduits extending down into the component primary vessels from above to provide for circulating liquid metal coolant in series from the primary vessel of the reactor component through the primary vessel of the pump component and the primary vessel of the heat exchanger component then back to the vessel of the reactor component a passive cooling system including a series of spaced apart side-by-side partitions in generally concentric arrangement surrounding the primary vessel of each component of the reactor satellite assembly forming a sequence of adjoining fluid flow space enclosures, said respective space enclosures around each satellite assembly component primary vessel being connected in series fluid communication with corresponding space enclosures of the other assembly paired component vessels, the passive cooling system including containment vessel substantially surrounding each of the primary vessels housing an assembly component in spaced apart arrangement, a cylindrical baffle wall substantially encircling each containment vessel of the satellite assembly in spaced apart relation extending down substantially the length of the containment vessels, a guard vessel having underlying supports substantially surrounding each containment vessel and cylindrical baffle wall of the reactor satellite assembly in spaced apart relation, said guard vessel supports resting on a reactor base, a concrete silo substantially surrounding the satellite assembly of reactor components in spaced apart relation, and a reactor shield deck bridging overhead across the satellite assembly of reactor components closing off the upper ends of each of said primary and containment vessel sealing the space therebetween from retaining a gas therein, a fluid flow heat transferring circuit for the passage of air coolant through a passive cooling system comprising at least one duct extending downward from opening to the ambient atmosphere above the reactor satellite assembly into the space intermediate the guard vessel and cylindrical baffle wall of each assembly component and around a bottom edge of the cylindrical baffle wall and upward through the space intermediate the cylindrical baffle wall and the containment vessel of each assembly component and out into the atmosphere through at least one duct extending upward from said space intermediate the cylindrical baffle wall and containment vessel of each assembly component and opening into the atmosphere for cooling the surface of the containment vessels; and a secondary passive cooling system including at least one opening to the atmosphere between the concrete silo and the reactor satellite assembly and openings in the guard vessel supports whereby heating of the guard vessel will induce a cooling and heat carrying flow of air from the atmosphere into the concrete silo space surrounding the guard vessels through the opening and over the guard vessels and back out into the atmosphere through at least one air return opening to the atmosphere.

* * * * *